United States Patent
Riordan et al.

(10) Patent No.: US 11,790,227 B1
(45) Date of Patent: Oct. 17, 2023

(54) SYSTEMS AND METHODS FOR NEURAL CONTENT SCORING

(71) Applicant: Educational Testing Service, Princeton, NJ (US)

(72) Inventors: Brian W. Riordan, Pennington, NJ (US); Kenneth Steimel, Bloomington, IN (US); Michael Flor, Lawrence Township, NJ (US); Robert A. Pugh, San Jose, CA (US)

(73) Assignee: Educational Testing Service, Princeton, NJ (US)

( * ) Notice: Subject to any disclaimer, the term of this patent is extended or adjusted under 35 U.S.C. 154(b) by 206 days.

(21) Appl. No.: 17/148,742

(22) Filed: Jan. 14, 2021

Related U.S. Application Data (60) Provisional application No. 63/014,733, filed on Apr. 24, 2020, provisional application No. 62/961,983, filed on Jan. 16, 2020.

(51) Int. Cl.
*G06N 3/08* (2023.01)
*G06F 40/284* (2020.01)
*G06F 40/232* (2020.01)

(52) U.S. Cl.
CPC ............. *G06N 3/08* (2013.01); *G06F 40/232* (2020.01); *G06F 40/284* (2020.01)

(58) Field of Classification Search
None
See application file for complete search history.

(56) References Cited

U.S. PATENT DOCUMENTS

| | | | | |
|---|---|---|---|---|
| 10,373,047 | B2* | 8/2019 | Higgins | G06N 3/0454 |
| 2018/0121799 | A1* | 5/2018 | Hashimoto | G06N 3/0454 |
| 2018/0203848 | A1* | 7/2018 | Perez | G10L 25/30 |
| 2020/0026760 | A1* | 1/2020 | Chiu | G06F 40/20 |
| 2021/0049298 | A1* | 2/2021 | Suresh | G06V 10/7796 |

OTHER PUBLICATIONS

Cai, Changzhi. "Automatic essay scoring with recurrent neural network." In Proceedings of the 3rd International Conference on High Performance Compilation, Computing and Communications, pp. 1-7. 2019. (Year: 2019).*

(Continued)

*Primary Examiner* — Frank D Mills
(74) *Attorney, Agent, or Firm* — Jones Day (57) ABSTRACT

Systems and methods are disclosed for automatically scoring a constructed response using a neural network. In embodiments, a constructed response received by a processing system may be processed to divide the constructed response into multiple series of word tokens, wherein each word token includes a sequence of characters. The constructed response may be further processed to correct one or more spelling errors. The word tokens may be encoded to generate representation vectors for the constructed response. A set of nonlinear operations may be applied to the plurality of representation vectors in a neural network to generate a single vector output. A set of predetermined network weights may be applied to the vector output of the neural network to generate a scalar output for scoring the constructed response.

20 Claims, 8 Drawing Sheets

(56) References Cited

OTHER PUBLICATIONS

Dong, Fei, Yue Zhang, and Jie Yang. "Attention-based recurrent convolutional neural network for automatic essay scoring." In Proceedings of the 21st conference on computational natural language learning (CoNLL 2017), pp. 153-162. 2017. (Year: 2017).*

Rodriguez, Pedro Uria, Amir Jafari, and Christopher M. Ormerod. "Language models and automated essay scoring." arXiv preprint arXiv:1909.09482 (2019). (Year: 2019).*

Izmailov, Pavel, Dmitrii Podoprikhin, Timur Garipov, Dmitry Vetrov, and Andrew Gordon Wilson. "Averaging weights leads to wider optima and better generalization." arXiv preprint arXiv:1803.05407 (2018). (Year: 2018).*

Adhikari, Ashutosh, Ram, Achyudh, Tang, Raphael, Lin, Jimmy; Rethinking Complex Neural Network Architectures for Document Classification; Proceeding of the 2019 Conference of the North American Chapter of the Association for Computational Linguistics: Human Language Technologies, vol. 1 (Long and Short Papers) Minneapolis, MN; pp. 4046-4051; 2019.

Burrows, Steven, Gurevych, Iryna, Stein, Benno; The Eras and Trends of Automatic Short Answer Grading; International Journal of Artificial Intelligence in Education, 25(1); pp. 60-117; 2015.

Burstein, Jill, Tetreault, Joel, Madnani, Nitin; The E-rater Automated Essay Scoring System; Ch. 4, Handbook of Automated Essay Scoring: Current Applications and Future Directions, M. Shermis & J. Burstein Eds.; Routledge: New York, NY; pp. 55-67; 2013.

Flor, Michael, Futagi, Yoko; On Using Context for Automatic Correction of Non-Word Misspellings in Student Essays; Proceedings of the 7th Workshop on Innovative Use of NLP for Building Educational Applications; Montreal, Canada; pp. 105-115; Jun. 2012.

Flor, Michael; Four Types of Context for Automatic Spelling Correction; Traitement Automatique des Langues (TAL), 53(3); Special Issue: Managing Noise in the Signal: Error Handling in Natural Langauge Processing; pp. 61-99; 2012.

Horbach, Andrea, Zesch, Torsten; The Influence of Variance in Learner Answers on Automatic Content Scoring Frontiers in Education, 4(28); Apr. 2019.

Johnson, Rie, Zhang, Tong; Deep Pyramid Convolutional Neural Networks for Text Categorization; Proceedings of the 55th Annual Meeting of the Association for Computational Linguistics (vol. 1 Long Papers); Vancouver, Canada pp. 562-570; Jul. 2017.

Kumar, Sachin, Chakrabarti, Soumen, Roy, Shourya; Earth Mover's Distance Pooling Over Siamese LSTMs for Automatic Short Answer Grading; Proceedings of the 26th International Joint Conference on Artificial Intelligence (IJCAI); pp. 2046-2052; Aug. 2017.

Liu, Nelson, Gardner, Matt, Belinkov, Yonatan, Peters, Matthew, Smith, Noah; Linguistic Knowledge and Transferability of Contextual Representations; Proceedings of the 2019 Conference of the North American Chapter of the Association for Computational Linguistics: Human Language Technologies, vol. 1 (Long and Short Papers); Minneapolis, MN; pp. 1073-1094; Jun. 2019.

Riordan, Brian, Flor, Michael, Pugh, Robert; How to Account for Mispellings: Quantifying the Benefit of Character Representations in Neural Content Scoring Models; Proceedings of the 14th Workshop on Innovative Use of NLP for Building Educational Applications; Florence, Italy; pp. 116-126; Aug. 2019.

Shen, Dinghan, Wang, Guoyin, Wang, Wenlin, Min, Martin Renqiang, Su, Qinliang, Zhang, Yizhe, Li, Chunyuan, Henao, Ricardo, Carin, Lawrence; Baseline Needs More Love: On Simple Word-Embedding-Based Models and Associated Pooling Mechanisms; Proceedings of the 56th Annual Meeting of the Association for Computational Linguistics; Melbourne, Australia; pp. 440-450; 2018.

Shermis, Mark; Contrasting State-of-the-Art in the Machine Scoring of Short-Form Constructed Responses Educational Assessment, 20(1); pp. 46-65; 2015.

Sung, Chui, Dhamecha, Tejas Indulal, Mukhi, Nirmal; Improving Short Answer Grading Using Transformer-Based Pre-training; Artificial Intelligence in Education; pp. 469-481; 2019.

Taghipour, Kaveh, Ng, Hwee Tou; A Neural Approach to Automated Essay Scoring; Proceedings of the 2016 Conference on Empirical Methods in Natural Language Processing; Austin, Texas; pp. 1882-1891; Nov. 2016.

Wang, Alex, Singh, Amanpreet, Michael, Julian, Hill, Felix, Levy, Omer, Bowman, Samuel; Glue: A Multi-Task Benchmark and Analysis Platform for Natural Language Understanding; Proceedings of the 2017 EMNLP Workshop BlackboxNLP: Analyzing and Interpreting Neural Networks for NLP; Brussels, Belgium; pp. 353-355; Nov. 2018.

Chen, Huadong, Huang, Shujian, Chiang, David, Dai, Xinyu, Chen, Jiajun; Combining Character and Word Information in Neural Machine Translation Using a Multi-Level Attention; Proceedings of the North American Chapter of the Association for Computational Linguistics: Human Language Technologies; New Orleans, LA; pp. 1284-1293; Jun. 2018.

Harrison, Xavier, Donaldson, Lynda, Correa-Cano, Maria Eugenia, Evans, Julian, Fisher, David, Goodwin, Cecily, Robinson, Beth, Hodgson, David, Inger, Richard; A Brief Introduction to Mixed Effects Modeling and Multi-Model Inference In Ecology; PeerJ, 6(1); May 2018.

Horbach, Andrea, Ding, Yuning, Zesch, Torsten; The Influence of Spelling Errors on Content Scoring Performance; Proceedings of the 4th Workshop on Natural Language Processing Techniques for Educational Applications; Taipei, TW; pp. 45-53; Dec. 2017.

Johnson, Rie, Zhang, Thong; Effective Use of Word Order for Text Categorization with Convolutional Neural Networks; North American Chapter of the Association for Computational Linguistics: Human Language Technologies Denver, CO; pp. 103-112; May-Jun. 2015.

Luong, Minh-Thang, Manning, Christopher; Achieving Open Vocabulary Neural Machine Translation with Hybrid Nord-Character Models; Association for Computational Linguistics; 2016.

Madnani, Nitin, Loukina, Anastassia, Cahill, Aoife; A Large Scale Quantitative Exploration of Modeling Strategies for Content Scoring; Proceedings of the 12th Workshop on Innovative Use of NLP for Building Educational Applications; Copenhagen, Denmark; pp. 457-467; Sep. 2017.

Pennington, Jeffrey, Socher, Richard, Manning, Christopher; GloVe: Global Vectors for Word Representation Proceedings of the Conference on Empirical Methods in Natural Language Processing; 2014.

Peters, Matthew, Ammar, Waleed, Bhagavatula, Chandra, Power, Russell; Semi-Supervised Sequence tagging with Bidirectional Language Models; Association for Computational Linguistics; 2017.

Ramachandran, Lakshmi, Cheng, Jian, Foliz, Peter; Identifying Patterns for Short Answer Scoring Using Graph-Based Lexico-Semantic Text Matching; Proceedings of the 10th Workshop on Innovative Use of NLP for Building Educational Applications; Denver, CO; pp. 97-106; Jun. 2015.

Yang, Zichao, Yang, Diyi, Dyer, Chris, He, Xiaodong, Smola, Alex, Hovy, Eduard; Hierarchical Attention Networks for Document Classification; North American Chapter of the Association for Computational Linguistics Human Language Technologies; 2016.

Zalmout, Nasser, Habash, Nizar; Don't Throw Those Morphological Analyzers Away Just Yet: Neural Morphological Disambiguation for Arabic; Proceedings of the 2017 Conference on Empirical Methods in Natural Language Processing; Copenhagen, Denmark; pp. 704-713; Sep. 2017.

* cited by examiner

SYSTEMS AND METHODS FOR NEURAL CONTENT SCORING

CROSS-REFERENCE TO RELATED APPLICATION

This application claims priority to U.S. Provisional Patent Application No. 63/014,733, filed on Apr. 24, 2020, and titled "Quantifying the Benefit of Character Representations in Neural Content Scoring Methods," and also claims priority to U.S. Provisional Patent Application No. 62/961,983, filed on Jan. 16, 2020, and titled "Towards Instance-Based Content Scoring with Pre-Trained Transformer Models," the entireties of which are incorporated herein by reference.

TECHNICAL FIELD

The technology described herein relates generally to computer-based test scoring systems.

BACKGROUND

To evaluate the understanding, comprehension, or skill of students in an academic environment, the students are tested. Typically, educators rely on multiple-choice examinations to evaluate students. Multiple-choice examinations quickly provide feedback to educators on the students' progress. However, multiple-choice examinations may reward students for recognizing an answer versus constructing or recalling an answer. Thus, another method of evaluating students utilizes test questions that require a constructed response. Examples of constructed responses include free-form, non-multiple choice responses such as essays, spoken responses, or show-your-work math responses. For some educators, use of a constructed response examination is preferred versus a multiple-choice examination because the constructed response examination requires the student to understand and articulate concepts in the tested subject matter. However, a length of time required to grade a constructed response may be considerable. Computer-implemented methods for automatically scoring a construed response have therefore been proposed, for example as described in U.S. Pat. No. 10,628,731.

When using a computer-implemented method to automatically score a constructed response, such as a written essay, spelling errors can interfere with the scoring process. Character-based representations have been utilized in a variety of computer models for natural language processing, including sequence labeling and machine translation. The rationale for the use of character representations, especially to augment a backbone of word representations in neural models, is typically based on enriching the input representations with morphological information, accounting for noise or out-of-vocabulary inputs, or both.

Training neural network-based machine learning models for predicting outcomes in various domains such as computer vision and natural language processing have been shown to benefit from forms of averaging of weights across steps in the training process. These methods produce higher accuracy and better generalization than standard Stochastic Gradient Descent-based optimization methods.

DETAILED DESCRIPTION

Content scoring is the task of scoring the content of answers to free-response questions, for example in educational applications (also known as short answer grading or scoring when responses are short, e.g., sentence length.) Unlike systems for essay scoring, which typically target writing quality more broadly, systems for content scoring focus on the accuracy of responses.

Content scoring is typically approached with machine learning methods to compare the similarity of student responses with expert-authored or otherwise model responses. In such "similarity-based" scoring, higher similarity to model responses indicates a higher score should be predicted. "Instance-based" approaches, by contrast, are machine learning methods that learn models of the characteristics of responses at different scores. It has been demonstrated that instance-based methods can be more accurate than similarity-based methods.

Including character representations in neural models for content scoring may, in some cases, account for spelling errors in the input because models that are sensitive to characters can implicitly learn the correspondence between incorrect and correct spelling or words from the character-sequence-to-score associations (as opposed to word-to-score) across the training data. However, while neural modules with additional character representations show a small but durable edge over word-only models for use in content scoring, it has been determined that this improvement does not increase significantly as the number of spelling errors in the input increases. It has been further determined that providing a spell corrected input improves model performance more than the addition of character representations, and that models with additional character representations can be improved further by using spell correction.

In instance-based content scoring and other machine learning settings that make predictions about the content of "documents" such as sentiment analysis, a sequence of numerical vectors, each representing a word, sub-word unit, or character, must be aggregated into a single numerical vector from which a prediction, such as a score, must be made. "Pooling" and "attention" mechanisms that aggregate these numerical vectors have been demonstrated to be effective in improving machine learning model predictions. In addition, it has been demonstrated that for transformer-based neural network models, aggregation functions across "layers" in the transformer network, such as a linear combination of the numerical vectors output by each layer, can improve machine learning model predictions.

Training neural network-based models for content scoring typically involves training datasets that are small relative to other applications of neural networks and diverse in terms of the goals of prediction because of the heterogeneous specification of scoring rubrics. Within these constraints, it has been shown that neural network training with methods for model weight averaging during the training process improves the human-machine agreement performance of content scoring models.

Figure 1:
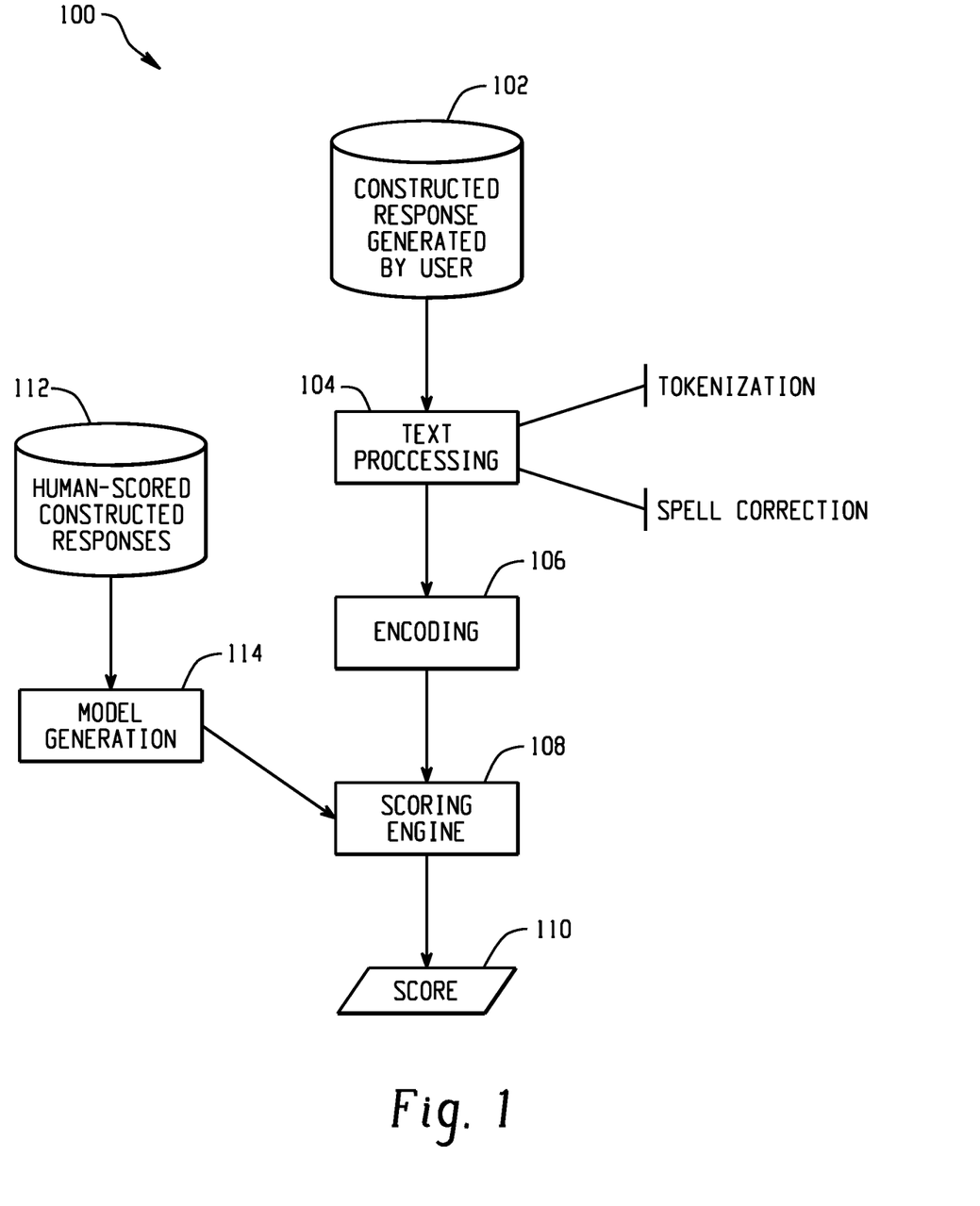
FIG. 1 is a block diagram illustrating an example computer-based system for automatically scoring a constructed response generated by a user utilizing both character representations and spell correction.

FIG. 1 is a block diagram 100 illustrating an example computer-based system for automatically scoring a constructed response 102 generated by a user. In an example, the constructed response 102 is a textual response that is provided by the user in response to a given item (e.g., a test question, task, etc.). In an example, the given item includes a prompt that requests that the user generate a constructed response that is a short answer (e.g., a single word or phrase not comprising a complete sentence), one or more complete sentences, and/or an essay (e.g., comprising multiple sentences and/or paragraphs). In an example, the given item includes a prompt that requests a spoken response from the user. In an example, the given item is any type of open-ended question that requests a free-form, non-multiple choice response from the user. In the example, the user is a human that generates the constructed response 102.

In an example, the given item presented to the user is used in assessing the user's reading comprehension, as demonstrated by the constructed response 102. Thus, in an example, the given item includes a passage of text, and a prompt requests that the user summarize the passage of text. In other examples, the given item is used in assessing the user's understanding of a concept, as demonstrated by the constructed response 102. For example, the given item may include a prompt that requests that the user explain a concept (e.g., "Describe the process of osmosis."). In another example, the given item is used in assessing the user's vocabulary knowledge, as demonstrated by the constructed response 102. For example, the given item may include a prompt that requests that the user define a word or write one or more sentences using the word. Thus, a score 118 generated by the computer-based system of FIG. 1 may be intended to provide a measure of one or more of these abilities of the user (e.g., the user's reading comprehension, understanding of a concept, vocabulary knowledge, etc.).

The constructed response 102 generated by the user is received at a text processing module 104 of the computer-based system, in an embodiment. Text processing performed on the constructed response 102 at the text processing module 104 may include tokenizing the constructed response 102 with a processing system to break the constructed response 102 down into a series of words, characters, punctuation marks, numerical digits, etc. The tokenization process may, for example, be carried out using conventional automated, computer-based tokenization software known to those of ordinary skill in the art such as, for example, the spaCy tokenizer. The text processing module 104 also corrects spelling errors and converts word tokens to canonical forms in the constructed response 102. For example, the spelling correction process may use information from other sources, including the prompt text, and rule-based methods to generate a dictionary that maps from word forms to canonical word forms. During processing, the word forms in the constructed response may be converted to their corresponding canonical word forms.

An encoding module 106 receives an output of the text processing module 104, which may include a plurality of characters, word "pieces", or word tokens for the constructed response 102. Each word may, for example, be represented with a sequence of characters. In an embodiment, the encoding module 106 may include a character encoder, a concatenator, and a combined word-character encoder. The encoding module 106 may, for instance, encode each sequence of characters with the character encoder, and then concatenate the encoded outputs with the word embedding prior to word-level encoding, for example as described below with reference to FIG. 2.

The output of the encoding module 106 is received by a scoring engine 108. In an embodiment, the scoring engine 108 may utilize a recurrent neural network (RNN) to generate a score 110 for the constructed response 102 based on a scoring model generated from a plurality of human-scored constructed responses 112. The scoring engine 108 may include source code for an application of a scoring model along with any third-party libraries, data files, trained models, and other relevant resources. A recurrent neural network (RNN) is a type of neural network that extends the feedforward neural network architecture to handle variable-length sequence input. The RNN maintains a hidden state whose activation at each step in the sequence is dependent on the activation at the previous step. This allows the RNN to process a sequence of inputs, such as sequences of words or characters.

To generate the trained scoring model used in the scoring engine 112, a model generation module 114 may be used. The model generation module 114 receives the plurality of human-scored constructed responses 112 with associated scores for each of the constructed responses 112 and uses the plurality of human-scored constructed responses 112 to determine weights for the model. The model generation module 114 may, for example, use the codebase of the text processing module 104 and the encoding module 106.

In an example, the plurality of human-scored constructed responses 112 may span a range of reference scores, and the constructed responses 112 may be scored constructed responses that have been accepted as usable for training the neural network model. As illustrated in FIG. 1, the model generation module 106 provides the trained model to the scoring engine 112. For example, with the RNN in place, the constructed response 102 may be scored by applying the RNN as noted above.

In another embodiment, the encoding module 106 and scoring engine 108 may utilize a pre-trained transformer-based model, for example as described below with reference to FIG. 4. Pre-trained transformer models leverage word representations that are learned from language models trained on very large corpora. A language model learns to predict words in the input corpus that are "masked out" during training. This "self-training" of predicting words in the input, when coupled with the "transformer" neural network architecture, yields word representations that are useful across many NLP tasks. Unlike RNNs, transformer networks use a form of attention—self-attention—between word-like representations.

It should be appreciated that under the approaches described herein, one or more computer-based models are used in determining the score 110 for the constructed response 102. By contrast, conventional human scoring techniques for determining a score for a constructed response would include none of these steps. Conventional human scoring techniques involve one or more human graders reviewing constructed responses and manually assigning scores to the constructed responses.

Figure 2:
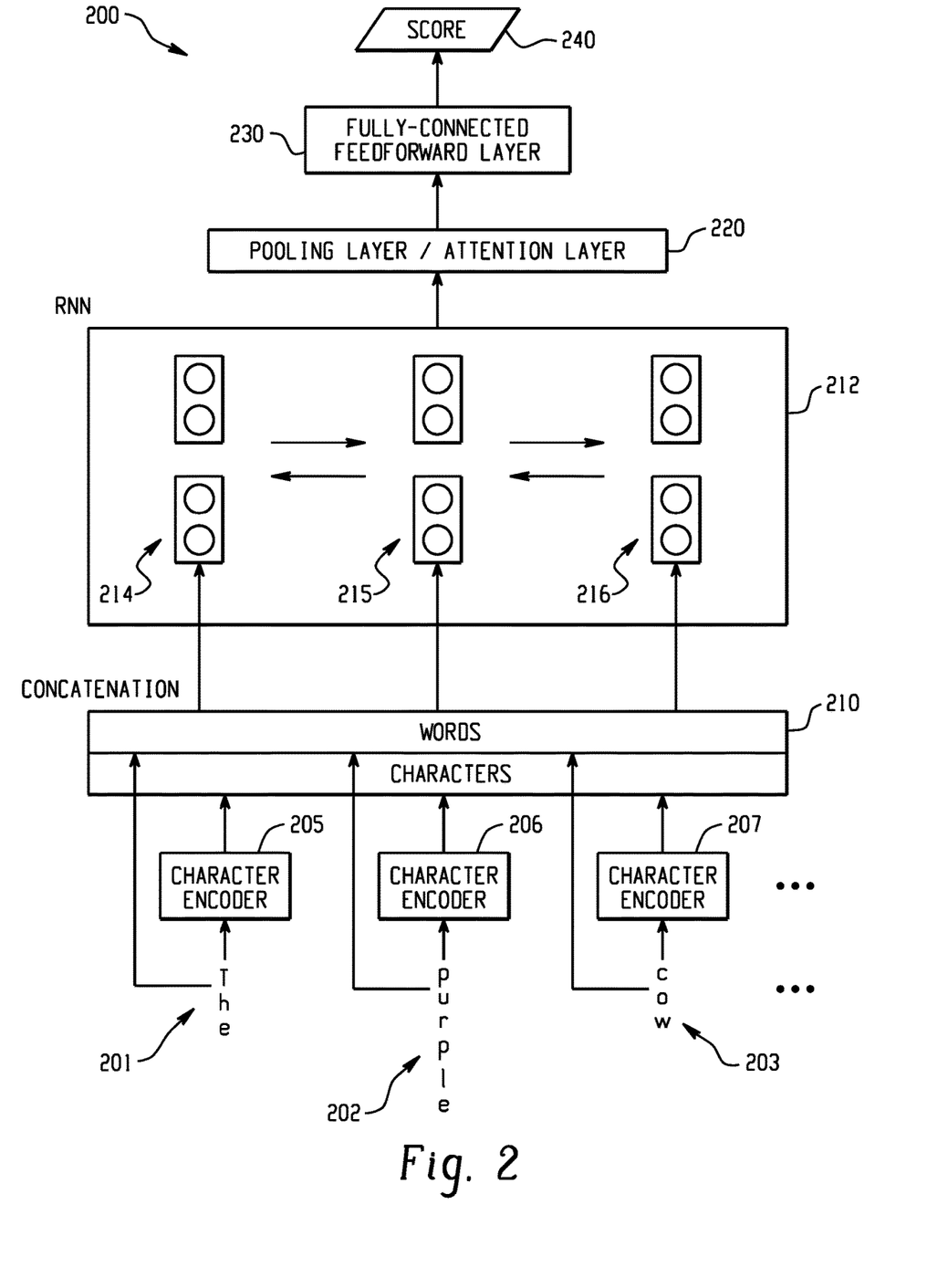
FIG. 2 is a block diagram of an example RNN-based network architecture that may, for example, be used in the automatic scoring system of FIG. 1.

FIG. 2 is a block diagram 200 of an example RNN-based network architecture that may, for example, be used in the automatic scoring system of FIG. 1. The example network 200 receives a series of word-character inputs 201-203, which may for example be the tokenized and spell corrected output from the text processing module 104 of FIG. 1. In the illustrated example, the word-character inputs 201-203 include the example sequence "The purple cow" from an example constructed response. Each word input 201-203 may, for example, be represented with a sequence of n-dimensional character embeddings, for example as described below with reference to FIG. 3. The sequences 201-203 are divided into a character-level stream and a word-level stream. The character-level stream is encoded with a character encoder 205-207, which is shared across the inputs 201-203, and the word-level stream is input to a concatenation module 210. The character encoder 205-207 may, for example, be a convolutional encoder with 100 filters and filter sizes of (3, 4, 5) (i.e., the concatenation of filter sizes 3, 4, and 5), for example as described below with reference to FIG. 3. The outputs of the character encoder 205-207 are vector representations of the word-character inputs 201-203, which are input to the concatenation module 210.

The word-level inputs 201-203 are encoded in the concatenation module 210, for example using GloVe 100 dimension vectors as pretrained embeddings, to generate vector representations of the words. Word-level inputs 201-203 that are not found in the embeddings may, for example, be mapped to a randomly initialized unknown word embedding. The word and character vectors for each stream 201-203 are then concatenated and input to a recurrent neural network (RNN) cell 212. Concatenation of vectors includes appending the character representation vector to the word representation vector, e.g., given a 100-dimensional word representation vector and a 25-dimensional character representation vector, the result would be a 125-dimensional concatenated representation vector.

The RNN cell 212 is a bidirectional RNN, for example including gated recurrent units (GRUs). The RNN cell 212 receives a vector 214-216 for each concatenated stream, and applies a set of nonlinear updates from the beginning to the end of the sequence to generate a single vector output 218. For example, the response of the RNN may be a sequence of $T_l$ words $w_1, \ldots, w_l$, where each time step t has an input $x_t$ and hidden state $h_t$. The mechanics of the Gated Recurrent Unit (GRU) may be expressed as:

$$z_t = \sigma(W^{(z)} x_t + U^{(z)} h_{t-1} + b^{(z)})$$

$$r_t = \sigma(W^{(r)} x_t + U^{(r)} h_{t-1} + b^{(r)})$$

$$\tilde{h}_t = \tanh(W x_t + r_t \circ U h_{t-1} + b^{(h)})$$

$$h_t = z_t \circ h_{t-1} + (1 - z_t) \circ \tilde{h}_t$$

where: $\circ$ is an element-wise product; $W^{(z)}, W^{(r)}, W \in \mathbb{R}^{n_H \times n_I}$; $U^{(z)}, U^{(r)}, U \in \mathbb{R}^{n_H \times n_H}$; and n is a hyperparameter. The GRU computation may be abbreviated as:

$$h_t = GRU(x_t, h_{t-1})$$

The hidden states of the RNN output 218 are aggregated by a pooling or attention module 220. In an embodiment, a pooling mechanism may be used to provide a mean and max pooling operation that looks across the time steps of the RNN vector output 218 to determine the maximum activation for each cell in the vector. Max pooling produces a single sequence embedding $s_{emb}$.

$$s_{emb}^i = \max_{t \in (1,n)} (h_t^i)$$

where $h_t^i$ is the ith dimension of h at time step t.

In another embodiment, an attention mechanism, such a multilayer perceptron (MLP)-based document-level attention mechanism, may be used to aggregate the RNN vector output 218. For example, a document context vector u may be updated at word i with $u_i = \tan h(W h_i + b)$. The attention may be computed with $\alpha_i = \exp(u_i^T u) / \Sigma_i \exp(u_i^T u)$ and $d = \Sigma_i \alpha_i h_i$ for a document d (response) and RNN states h.

The output of the pooling or attention module 220 is aggregated in a fully-connected feedforward layer 230 that computes a scalar output for the predicted score 240. The feedforward layer 230 may, for example, be a feedforward neural network with nonlinear activation: $y = \sigma(W s_{emb} + b)$ where $\sigma$ is the sigmoid function, W is a weight matrix, and b is a bias term.

Figure 3:
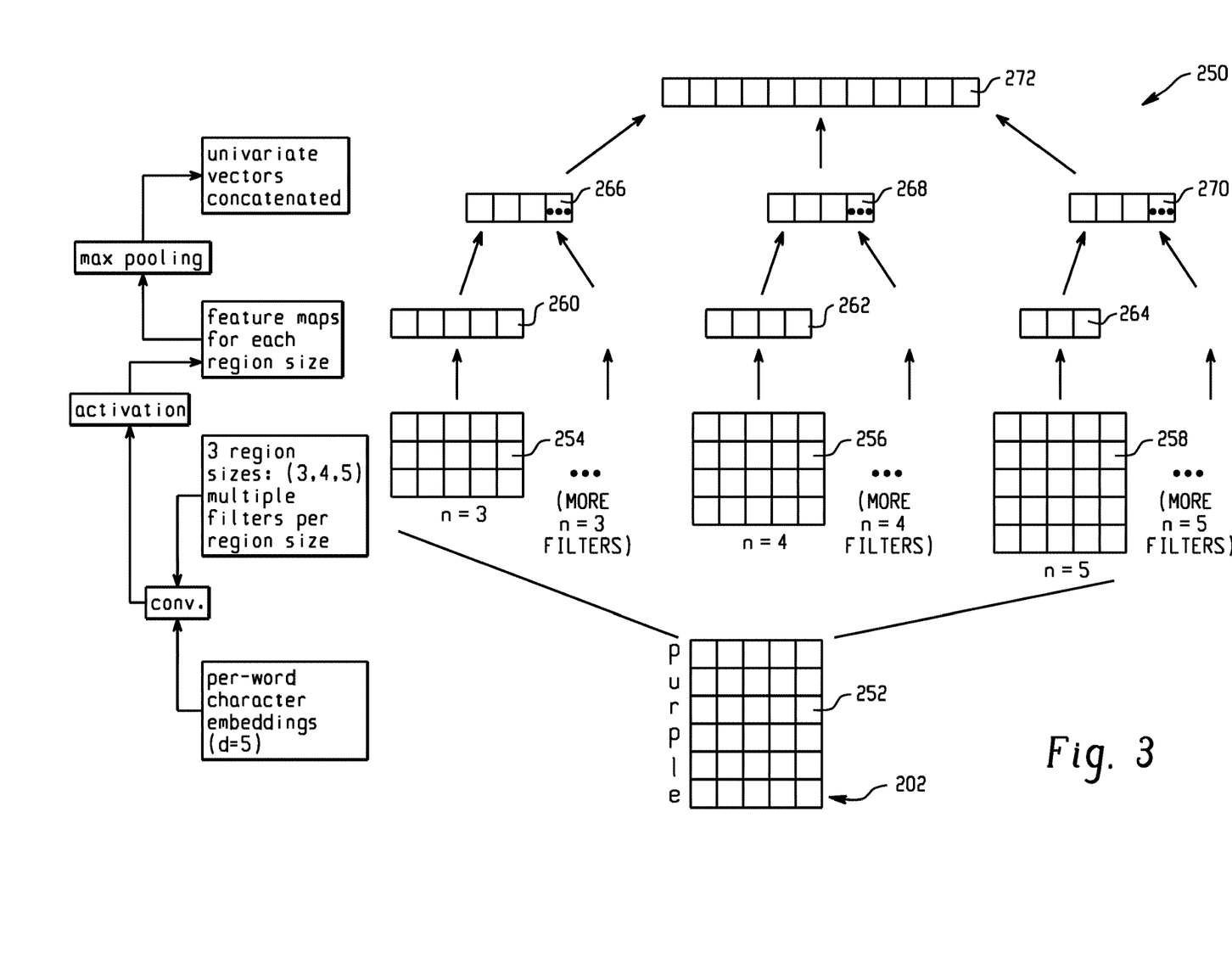
FIG. 3 is a block diagram of an example character encoder that may, for example, be used in the RNN-based network of FIG. 2.

FIG. 3 is a block diagram of an example character encoder 250 that may, for example, be used in the RNN-based network of FIG. 2. In the illustrated example, the character encoder 250 receives the example word-character input "purple" 202 from a constructed response. In the illustrated embodiment, the word-character input 202 is converted into a d-dimensional character embedding matrix 252 (d=5 in the illustrated example). The character embedding matrix 252 can then be treated similarly to an image, upon which convolution may be performed using linear filters 254, 256, 258.

The linear filters 252, 256, 258 each have a filter width equal to the dimensionality (d) of the character embedding (i.e., 5 in the illustrated example.) The "region size" h of linear filters 252, 256, and 258 is varied, with linear filter 254 having a region size of 3, linear filter 256 having a region size of 4, and linear filter 258 having a region size of 5 in the illustrated example. In embodiments, multiple linear filters may be included for each region size to identify complementary features from the same region. For example, in an embodiment the character encoder 250 may include 100 linear filters. Each filter is associated with a weight matrix w of dimensions h×d. The convolution operation is defined as follows. Let the matrix $A \in \mathbb{R}^{s \times d}$ and A[i:j] the submatrix from row (character) i to row j. A filter is applied to each submatrix of A:

$$o_i = w \cdot A[i : i + h - 1]$$

where i=1 ... s−h+1, · is a dot product between the submatrix and the weight matrix w of the filter, and $o_i$ is an element in $o \in \mathbb{R}^{s-h+1}$.

The linear filters 252, 256, 258 generate a feature map 260, 262, 264 for each region size. A feature map is defined as $$c_i = f(o_i + b)$$

where b is a real-valued bias term, f is a nonlinear activation function such as tanh, and $c \in \mathbb{R}^{s-h+1}$. The dimensionality of the feature maps 260, 262, 264 vary as a function of the filter region size. A pooling function may therefore be applied to each feature map 260, 262, 264 to generate fixed-length vectors 266, 268, 270. The pooling function may, for example, employ max pooling to extract a scalar from each feature map 260, 262, 264. The fixed-length vectors 266, 268, 270 generated from each filter map may then be concatenated into a fixed-length feature vector, which is the vector representation of the input 202 that is output from the character encoder 250.

Figure 4:
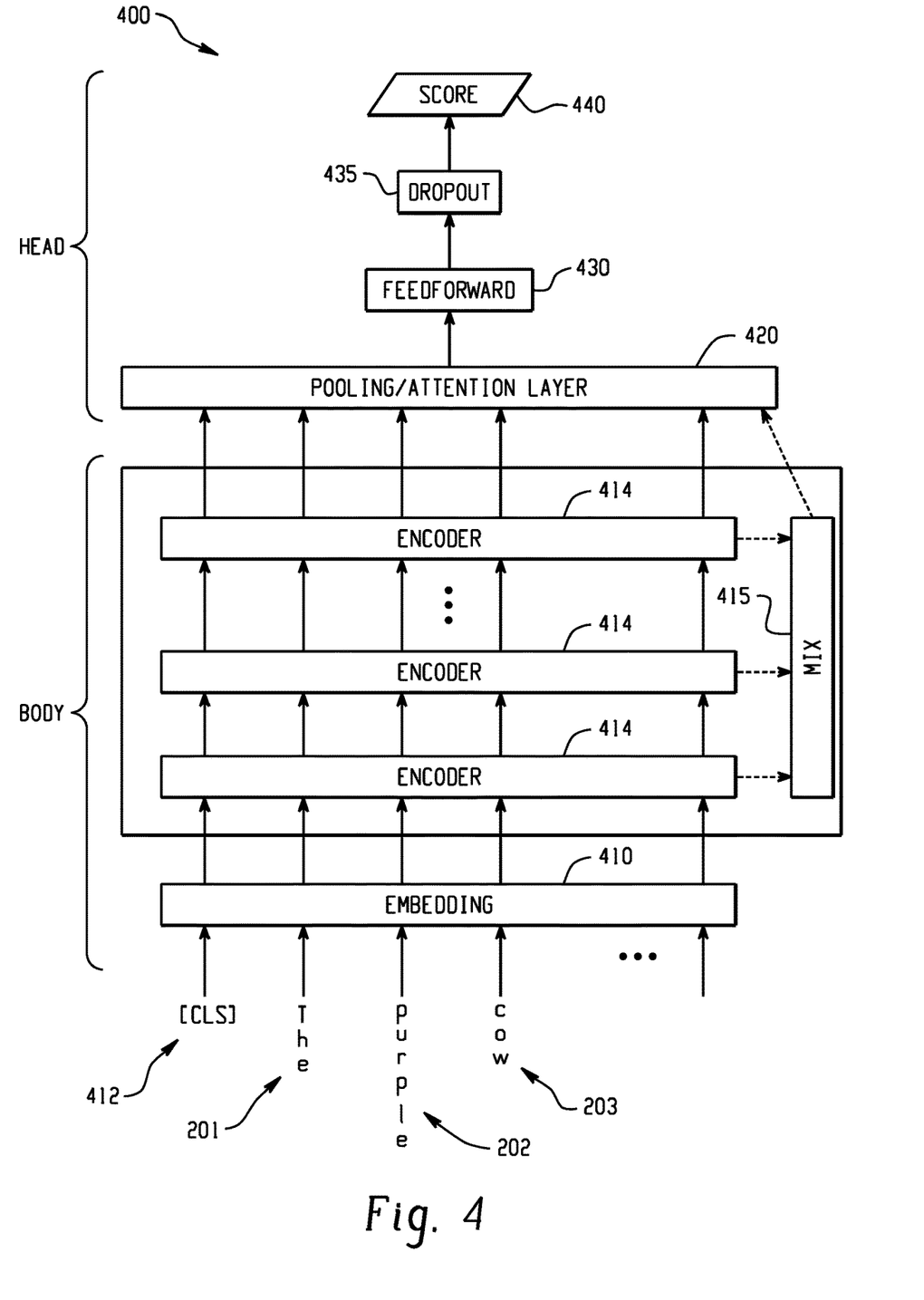
FIG. 4 is a block diagram of a pretrained transformer-based network architecture that may, for example, be used in the automatic scoring system of FIG. 1.

FIG. 4 is a block diagram 400 of a pretrained transformer-based network architecture that may, for example, be used in the automatic scoring system of FIG. 1.

Figure 5:
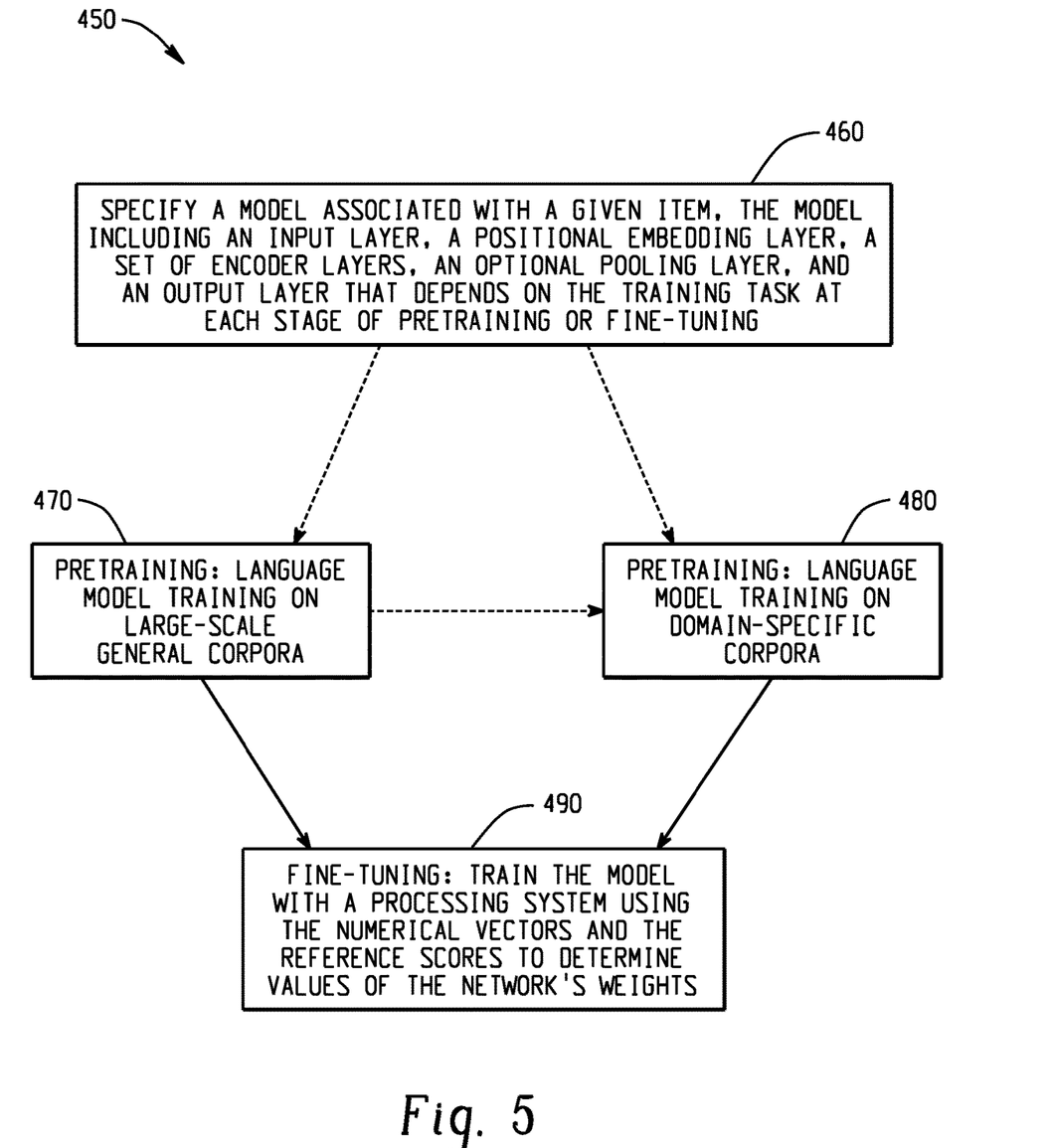
FIG. 5 is a flow diagram of an example training procedure for scoring content.

Pretrained transformers, as shown in FIG. 4, produce word representations using a neural network architecture based on self-attention that is trained on language modeling tasks such as masked word prediction, next sequence prediction, and others. An example training procedure 450 for scoring content is depicted in FIG. 5. The example training procedure shown in FIG. 5 includes language model-based pretraining of word representations, language model-based training on domain-specific corpora, and fine-tuning on training data for specific applications. At block 460 a model associated with a given item is specified, with the model including an input layer, a positional embedding layer, a set of encoder layers, an optional pooling layer, and an output layer that depends on the training task at each stage of pretraining or fine-tuning. At block 470, language model-based pretraining may be performed on large-scale general corpora. At block 480, language model-based pretraining may be performed on domain-specific corpora. At block 490 model fine-tuning may be performed, for example by training the model with a processing system using numerical vectors and reference scores to determine values of the network weights.

The training operations shown in FIG. 5 may, for example, be combined in several ways depending on the goals of the item and the available training data. In one example embodiment, the transformer model is trained with a language modeling objective on large-scale general corpora (at block 470), followed by supervised fine-tuning on item-specific training data (at block 490). In another example embodiment, the transformer model is trained with a language modeling objective on large-scale general corpora (at block 470), followed by additional training with a language modeling objective on domain-specific corpora (at block 480), followed by supervised fine-tuning on item-specific training data (at block 490). In another example embodiment, the transformer model is trained with a language modeling objective on large-scale domain-specific corpora (at block 470), followed by supervised fine-tuning on item-specific training data (at block 490). During the supervised fine-tuning training stage, a single sequence regression objective may be used.

With reference again to FIG. 4, the example network 400 receives a series of inputs 201-203, which may, for example, be the tokenized and spell corrected output from the text processing module 104 of FIG. 1. Tokenization of data occurs prior to modeling in both the pretraining and fine-tuning stages. At the pretraining stage, in an embodiment, tokenization uses "word pieces" or other subword units. At the fine-tuning stage, tokenization uses word pieces or standard tokenizers such as spaCy. In an embodiment, at the fine-tuning stage, vectors for word pieces are aggregated into vectors for each word by averaging word piece vectors comprising words.

The word inputs 201-203 in FIG. 4 are received by a transformer architecture 400. The pretrained transformer model includes a "body" and task-specific "heads". The body includes an embeddings layer 410 and multiple repeated encoder layers 414. The transformer architecture 400 may, for example, be a 12-layer bidirectional transformer model trained on the tasks of masked token prediction and next sentence prediction across very large corpora. During training, a special token, [CLS] 412, is added to the beginning of each input sequence.

In the embeddings layer 410, an embedding is computed from element-wise addition of two or more individual embeddings. For each word piece, an input embedding vector is generated by random initialization or similar method. For each word piece, a positional embedding vector is generated from the position of the word piece in the sequence (based on absolute position and random initialization, relative position, or similar method). After addition, the combined embedding vector is processed by a layer normalization operation and dropout regularization.

Figure 6:
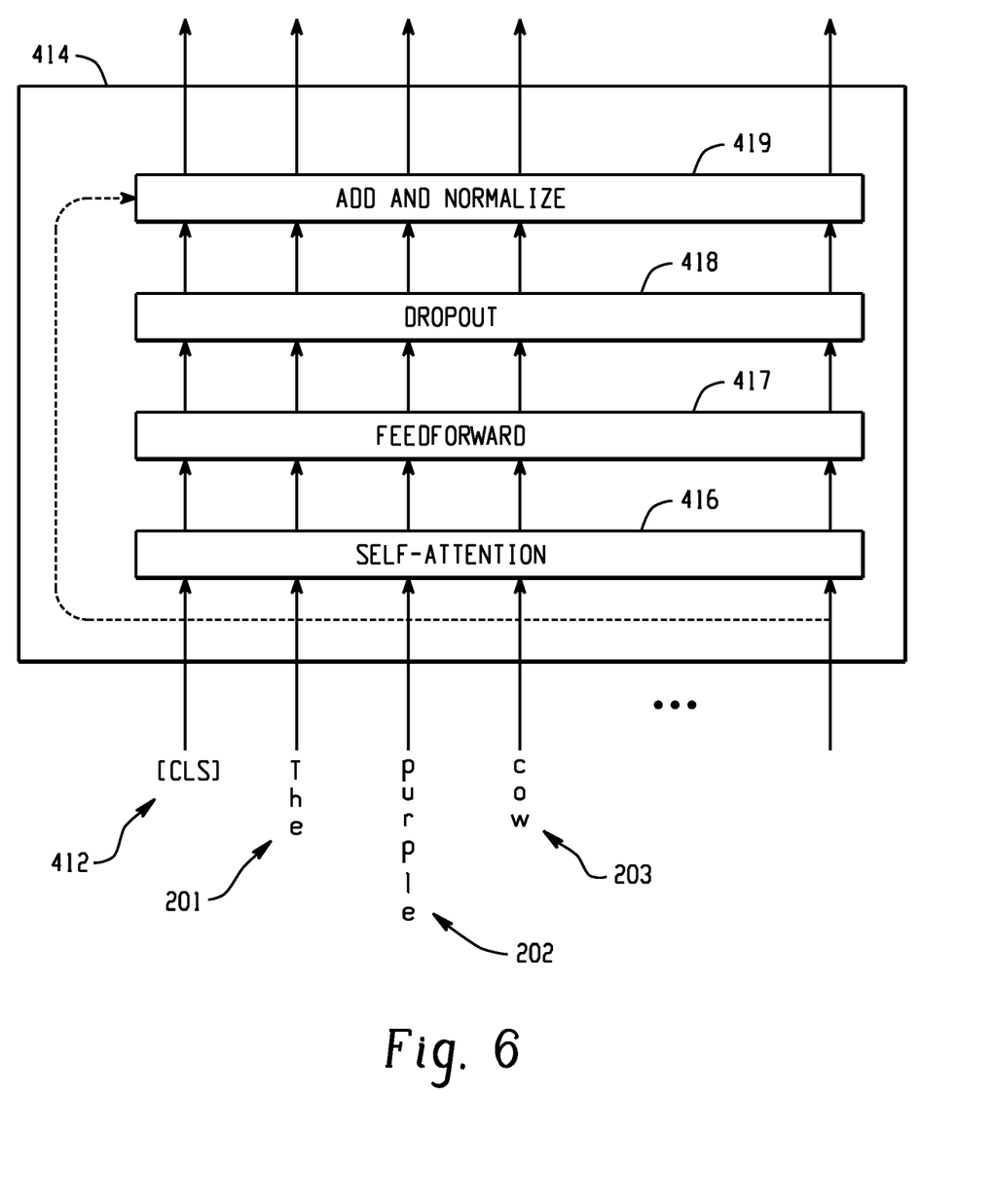
FIG. 6 is a block diagram of an example encoder that may, for example, be used in the transformer-based network architecture of FIG. 5.

An example of an encoder 414 for the transformer architecture 400 is shown in FIG. 6. As shown in FIG. 6, in each encoder block 414, the input vectors for each word piece may be processed by a self-attention layer 416, followed by a feedforward layer 417, dropout regularization 418, addition of the input vectors to the transformed vectors and layer normalization 419.

Self-attention 416 may include six steps. First, the input vector for a word piece is duplicated three times to form a query vector, a key vector, and a value vector. These vectors may be transformed to reduced dimension vectors for the self-attention operation. Second, for a given query vector, the dot product of the query vector and each key vector for each word piece in the sequence is computed. Third, the resulting scalar-valued scores are divided by the square root of the dimension of the vectors. Fourth, the resulting scalar-valued scores are transformed with the softmax operation. Fifth, the resulting score is multiplied with the value vector of each word piece. Sixth, the resulting weighted value vectors are summed. The result of these operations is the self-attention-transformed vector for the given word piece. These six steps are repeated for each word piece in the sequence.

Within each encoder block 414, there are multiple attention "heads". Each attention head carries out the self-attention operation in parallel. The outputs of the attention heads are concatenated, and the result is processed by the next steps in the encoder block 414.

With reference again to FIG. 4, the "head" for the fine-tuning stage may include a pooling/attention layer 420, a feedforward layer 430, dropout regularization 435, and score prediction 440. In an embodiment, the pooling/attention layer 420 may consist of the output representation for a special token appended to the sequence (that has a pretrained representation from the pretraining stage(s)), followed by a feedforward layer 430, dropout regularization 435, and score prediction 440. In an embodiment, the pooling/attention layer 420 may consist of a max pooling operation across the output representations of each word token. In an embodiment, the pooling/attention layer 420 may consist of an attention operation across the output representations of each word token. In another embodiment, the input to the "head" component may be a linear combination ("mix") 415 of the representations from all of the layers of the "body" component.

Prior to model training, text may be spell-corrected, for example using conventional automated, computer-based algorithms known to those of ordinary skill in the art. In addition, prior to training, all scores of responses may be scaled to [0,1], and these scaled scores may be used as inputs to the networks. For evaluation, the scaled scores may be converted back to their original range. Networks may, for example, be trained with a mean squared error loss.

In an embodiment, models may be trained with 10-fold cross validation with train/validation/test splits. For example, the training data may be split into 10 folds of 90% training and 10% validation. For hyperparameter tuning, performance may, for example, be evaluated on the validation sets with the best performance recorded across epochs. For training final models after hyperparameter tuning, the training and validation sets may be combined, and training may, for example, be stopped at the average or median best epoch across validation folds rounded to the nearest epoch.

Figure 7:
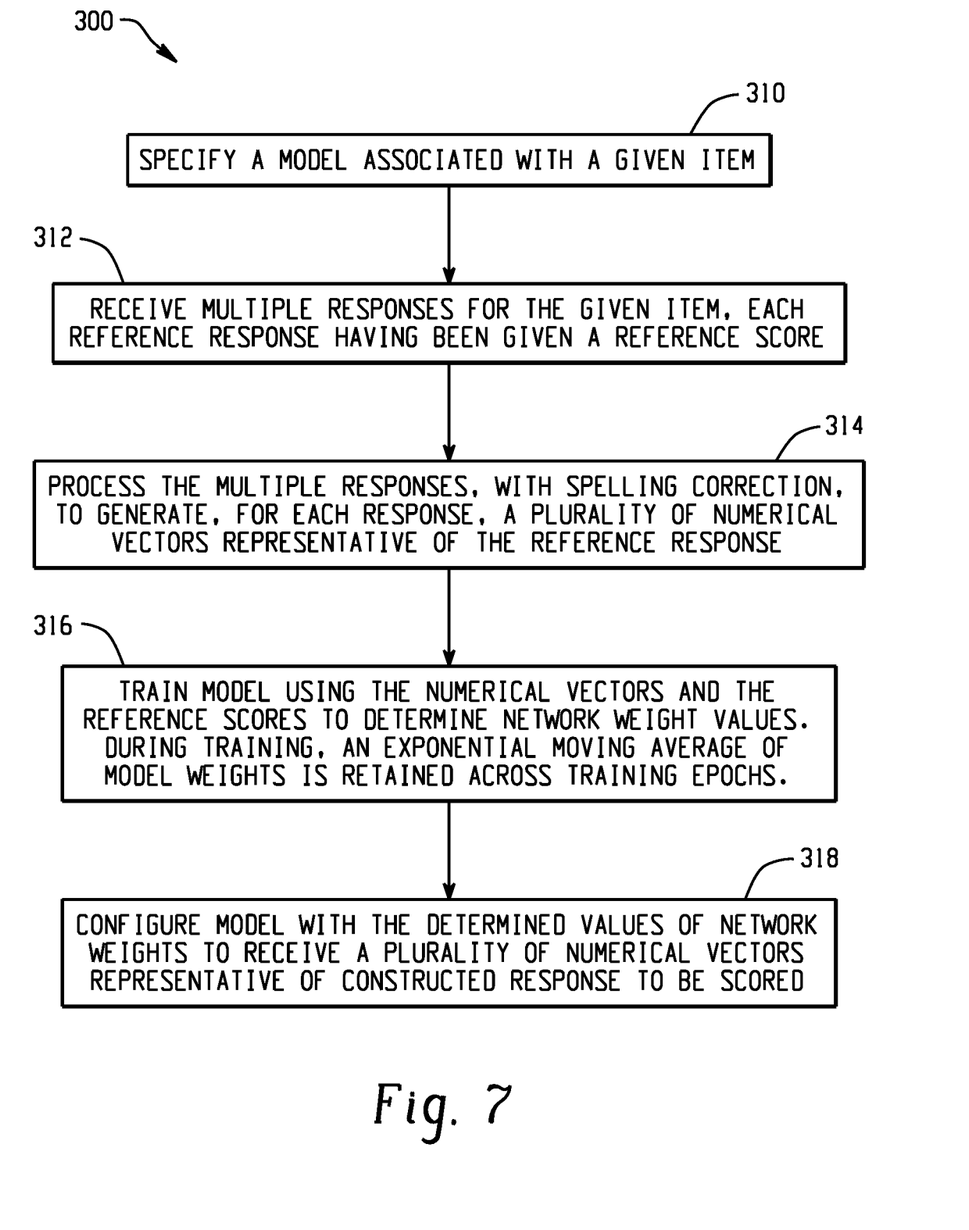
FIG. 7 is a flow diagram of an example method for training a scoring module.

FIG. 7 is a flow diagram of an example method 300 for training a scoring module. The example training method 300 may, for example, be used with the system of FIG. 1 and RNN-based network architecture of FIG. 2 or the transformer-based network architecture of FIG. 4. At block 310, a model structure is specified for association with a given item, such as a constructed response. In the example of an RNN-based network architecture, as shown in FIG. 2, the model may, for example, include an input layer, an embedding layer, a character convolutional layer, one or more recurrent layers, a pooling layer, and an output layer. The pooling layer may be instantiated as a "max-pooling" layer, taking the maximum value across corresponding cells in each numerical vector. In the example of transformer-based network architectures, as shown in FIG. 4, the model may, for example, include an input layer, a positional embedding layer, a set of encoder layers, an optional pooling layer, and an output layer.

At block 312, multiple (e.g., human generated) reference responses are received for the given item, with each reference response having been given a reference score.

At block 314, the received reference responses are processed, with spelling correction, to generate, for each response, a plurality of numerical vectors representative of the reference response. The text may, for example, be processed with a spaCy tokenizer with limited custom post-processing to improve the tokenization outputs. Prior to training, all scores of responses may be scaled to [0,1] and the scaled scores may be used as inputs to the networks. For the word tokens, pre-trained embeddings such as GloVe 100 dimension vectors may be used and fine-tuned during training. Word tokens that are not found in the embeddings may be mapped to a randomly initialized UNK embedding. Each response may be padded to uniform length, but these padding tokens may be masked out during model training.

At block 316, the model is trained using the numerical vectors and the reference scores to determine network weight values. The network may, for example, be trained with a mean squared error (MSE) loss. The network's weights may be averaged in various ways across steps in Stochastic Gradient Descent, e.g., by exponential moving average or stochastic weight averaging. For example, an exponential moving average of the model's weights $w_{EMA}$ may, for example, be updated after each batch with:

$$w_{EMA} \mathrel{-}= (1.0-d)*(w_{EMA}-w_{current}),$$

where d is a decay rate that is updated dynamically at each batch taking into account the number of batches so far:

$$\min\left(\text{decay}, \frac{1+\#\text{batches}}{10+\#\text{batches}}\right),$$

where decay, the maximum decay rate, is set to 0.999.

At block 318, the model is configured with the determined values of network weights to receive a plurality of numerical vectors that are representative of constructed response to be scored.

Figure 8A:
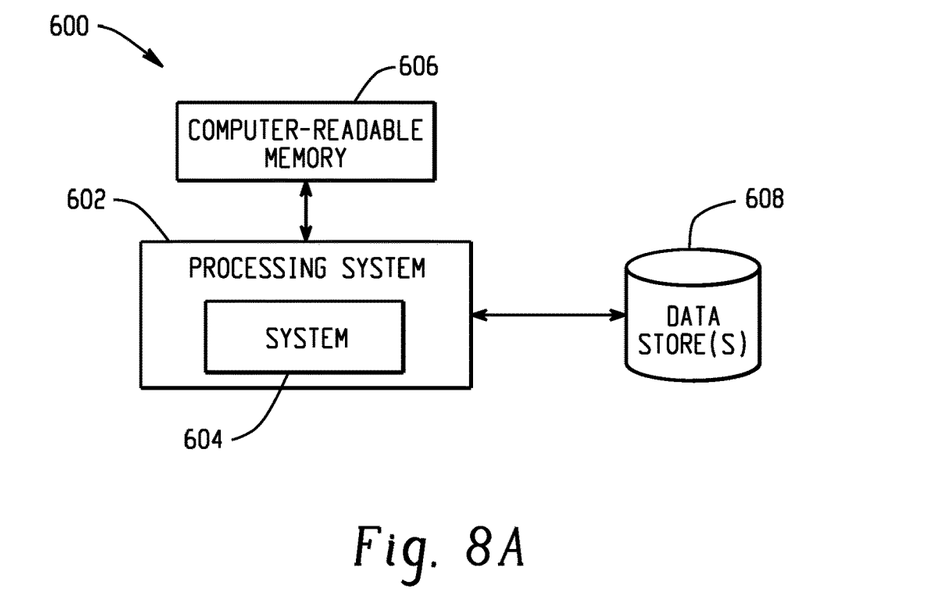
FIGS. 8A and 8B depict example systems that may be used to implement one or more of the systems and/or methods described in the present disclosure.
Figure 8B:
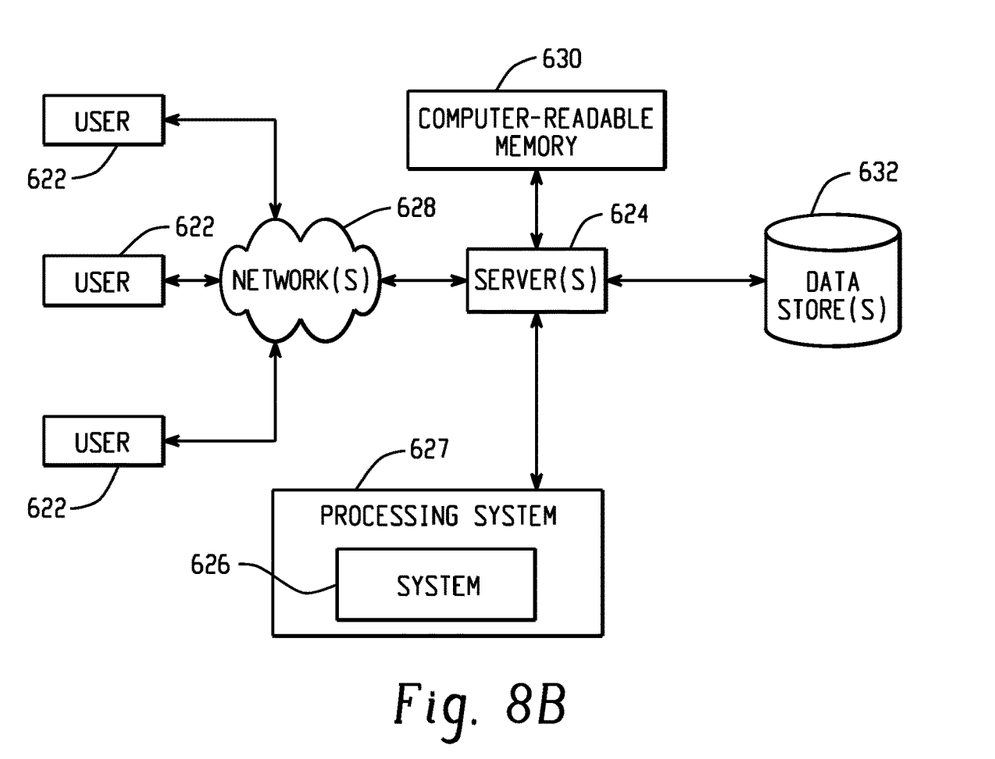

FIGS. 8A and 8B depict example systems that may, for example, be used to implement one or more of the systems and/or methods described in the present disclosure. For example, FIG. 8A depicts an exemplary system 600 that includes a standalone computer architecture where a processing system 602 (e.g., one or more computer processors) includes a system 604 being executed on it. The processing system 602 has access to a non-transitory computer-readable memory 606 in addition to one or more data stores 608.

FIG. 8B depicts a system 620 that includes a client server architecture. One or more user PCs 622 accesses one or more servers 624 running a system 626 on a processing system 627 via one or more networks 628. The one or more servers 624 may access a non-transitory computer readable memory 630 as well as one or more data stores 632.

Systems and methods are disclosed herein for automatically scoring a constructed response using a neural network. In embodiments, a constructed response received by a processing system may be processed to divide the constructed response into multiple series of word tokens, wherein each word token includes a sequence of characters. The constructed response may be further processed to correct one or more spelling errors. The word tokens may be encoded to generate representation vectors for the constructed response. A set of nonlinear operations may be applied to the plurality of representation vectors a neural network to generate a single vector output. A set of predetermined network weights may be applied to the vector output of the neural network to generate a scalar output for scoring the constructed response.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language or any other suitable programming language.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm, or in a computer script language, or as another type of computer code. The software components and/or functionality may be located on a single computer or distributed across multiple computers depending upon the situation at hand.

While the disclosure has been described in detail and with reference to specific embodiments thereof, it will be appar- It is claimed:

1. A method of automatically scoring a constructed response using a neural network, comprising:

training the network from a set of examples with a set of mathematical operations to average network weights across training steps by exponential moving average or stochastic weight average;

receiving the constructed response at a processing system;

processing the constructed response with the processing system to divide the constructed response into multiple series of word tokens, wherein each word token includes a sequence of characters;

processing the constructed response with the processing system to correct one or more spelling errors by converting one or more of the word tokens into a canonical form;

encoding, with the processing system, the sequence of characters in each word token using character-level encoding to generate character representation vectors;

encoding, with the processing system, each word token using word-level encoding to generate word representation vectors;

concatenating the word and character representation vectors for each series of word tokens to generate a plurality of concatenated representation vectors for the constructed response;

applying a set of nonlinear operations to the plurality of concatenated representation vectors using a recurrent neural network to generate a single vector output, wherein the set of nonlinear operations comprise:

$z_t = \sigma(W^{(z)} x_t + U^{(z)} h_{t-1} + b^{(z)})$;

$r_t = \sigma(W^{(r)} x_t + U^{(r)} h_{t-1} + b^{(r)})$;

$\tilde{h}_t = \tanh(W^{(z)} x_t + U^{(z)} h_{t-1} + b^{(z)})$; and $h_t = z_t \circ h_{t-1} + (1-z_t) \circ \tilde{h}_t$, wherein each time step t has an input $x_t$ and hidden state $h_t$; $W^{(z)}, W^{(r)}, W \in \mathbb{R}^{n_H \times n_I}$; $U^{(z)}, U^{(r)}, U \in \mathbb{R}^{n_H \times n_H}$; n is a hyperparameter; and applying a set of predetermined network weights to the vector output of the recurrent neural network to generate a scalar output for scoring the constructed response.

2. The method of claim 1, wherein the set of predetermined network weights are included in a scoring model generated from a plurality of human-scored constructed responses.

3. The method of claim 1, wherein the sequence of characters in each word token are encoded using a neural network encoder.

4. The method of claim 1, wherein the word tokens are encoded using pretrained word vectors.

5. The method of claim 1, wherein the recurrent neural network generates a sequence of words at sequential time steps, and wherein the sequence of words includes an input and a hidden state for each time step.

6. The method of claim 5, wherein the hidden states of the sequence of words are aggregated by a pooling or attention operation.

7. The method of claim 6, wherein a maximum pooling operation is used to generate a single sequence embedding.

8. The method of claim 1, wherein the vector output is aggregated in a feedforward neural network to generate the scalar output for scoring the constructed response.

9. A system for automatically scoring a constructed response, comprising:

one or more processors;

one or more non-transitory memories;

text processing software instructions stored in the one or more non-transitory memories and executable by the one or more processors, the text processing software instructions being configured to:

receive the constructed response, process the constructed response to divide the constructed response into multiple series of word tokens, wherein each word token includes a sequence of characters, and process the constructed response to correct one or more spelling errors by converting one or more word tokens to a canonical form;

encoding software instructions stored in the one or more non-transitory memories and executable by the one or more processors, the encoding software instructions being configured to encode the sequence of characters in each word token using character-level encoding to generate character representation vectors, encode each word token using word-level encoding to generate word representation vectors, and concatenate the word and character representation vectors for each series of word tokens to generate a plurality of concatenated representation vectors for the constructed response; and neural network software instructions stored in the one or more non-transitory memories and executable by the one or more processors, the neural network software instructions being configured to apply a set of nonlinear operations to the plurality of concatenated representation vectors using a recurrent neural network to generate a single vector output, wherein the set of nonlinear operations comprise:

$z_t = \sigma(W^{(z)} x_t + U^{(z)} h_{t-1} + b^{(z)})$;

$r_t = \sigma(W^{(r)} x_t + U^{(r)} h_{t-1} + b^{(r)})$;

$\tilde{h}_t = \tanh(W^{(z)} x_t + U^{(z)} h_{t-1} + b^{(z)})$;

$h_t = z_t \circ h_{t-1} + (1-z_t) \circ \tilde{h}_t$ wherein each time step t has an input $x_t$ and hidden state $h_t$; $W^{(z)}, W^{(r)}, W \in \mathbb{R}^{n_H \times n_I}$; $U^{(z)}, U^{(r)}, U \in \mathbb{R}^{n_H \times n_H}$; n is a hyperparameter; and apply a set of predetermined network weights to the vector output of the recurrent neural network to generate a scalar output for scoring the constructed response.

10. The system of claim 9, wherein the set of predetermined network weights are included in a scoring model generated from a plurality of human-scored constructed responses.

11. The system of claim 9, wherein the sequence of characters in each word token are encoded using a neural network encoder.

12. The system of claim 9, wherein the word tokens are encoded using pretrained word vectors.

13. The system of claim 9, wherein the recurrent neural network generates a sequence of words at sequential time steps, and wherein the sequence of words includes an input and a hidden state for each time step.

14. The system of claim 13, wherein the hidden states of the sequence of words are aggregated by a pooling or attention operation.

15. The system of claim 14, wherein a maximum pooling operation is used to generate a single sequence embedding.

16. The system of claim 9, wherein the vector output is aggregated in a feedforward neural network to generate the scalar output for scoring the constructed response.

17. The system of claim 9, further comprising training the network from a set of examples with a set of mathematical operations to average network weights across training steps by exponential moving average or stochastic weight average.

18. A method of automatically scoring a constructed response using a neural network, comprising:
receiving the constructed response at a processing system;
processing the constructed response with the processing system to divide the constructed response into multiple series of word tokens, wherein each word token includes a sequence of sub-word units or characters;
processing the constructed response with the processing system to correct one or more spelling errors by converting one or more word tokens to a canonical form;
encoding, with the processing system, each word token using multiple representations combined to generate a word representation vector;
applying a set of nonlinear operations to the word representation vectors using a transformer network to generate a single vector output wherein the set of nonlinear operations comprise:

$$z_t = \sigma(W^{(z)}x_t + U^{(z)}h_{t-1} + b^{(z)});$$

$$r_t = \sigma(W^{(r)}x_t + U^{(r)}h_{t-1} + b^{(r)});$$

$$\tilde{h}_t = \tanh(W^{(z)}x_t + U^{(z)}h_{t-1} + b^{(z)});$$

$$h_t = z_t \circ h_{t-1} + (1 - z_t) \circ \tilde{h}_t$$

wherein each time step t has an input $x_t$ and hidden state $h_t$; $W^{(z)}$, $W^{(r)}$, $W \in \mathbb{R}^{n_H \times n_I}$; $U^{(z)}$, $U^{(r)}$, $U \in \mathbb{R}^{n_H \times n_H}$; n is a hyperparameter; and
applying a set of predetermined network weights to the vector output of the transformer network to generate a scalar output for scoring the constructed response.

19. The method of claim 18, wherein the set of predetermined network weights are included in a scoring model generated from a plurality of human-scored constructed responses.

20. The method of claim 18, further comprising training the network from a set of examples with a set of mathematical operations to average network weights across training steps by exponential moving average or stochastic weight average.

* * * * *